US011956287B2

(12) United States Patent
Crovador et al.

(10) Patent No.: US 11,956,287 B2
(45) Date of Patent: Apr. 9, 2024

(54) METHOD AND SYSTEM FOR AUTOMATED SWITCHOVER TIMERS TUNING ON NETWORK SYSTEMS OR NEXT GENERATION EMERGENCY SYSTEMS

(71) Applicant: Unify Patente GmbH & Co. KG, Munich (DE)

(72) Inventors: Amauri Crovador, Campo Largo (BR); Rodrigo Kaminski Biermayr, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 18/295,288

(22) Filed: Apr. 4, 2023

(65) Prior Publication Data

US 2024/0073260 A1 Feb. 29, 2024

(30) Foreign Application Priority Data

Aug. 24, 2022 (EP) .................................. 22191989

(51) Int. Cl.
*H04L 65/1104* (2022.01)
*H04L 43/10* (2022.01)

(52) U.S. Cl.
CPC .......... *H04L 65/1104* (2022.05); *H04L 43/10* (2013.01)

(58) Field of Classification Search
None
See application file for complete search history.

(56) References Cited

U.S. PATENT DOCUMENTS

| 10,219,171 | B2* | 2/2019 | Mufti | ................ H04L 65/1046 |
| 2012/0124431 | A1* | 5/2012 | Bauer | ................ H04L 69/28 |
| | | | | 714/E11.067 |
| 2020/0192772 | A1* | 6/2020 | Asveren | ............. G06F 11/2023 |

FOREIGN PATENT DOCUMENTS

| EP | 2106065 B1 | 7/2014 |
| EP | 3454531 A1 | 3/2019 |

OTHER PUBLICATIONS

Author: Rahman et al. Title: Using Adaptive Heartbeat Rate on Long-Lived TCP Connections Publisher: IEEE (Year: 2018).*

(Continued)

*Primary Examiner* — John A Follansbee
*Assistant Examiner* — Kamal M Hossain
(74) *Attorney, Agent, or Firm* — Buchanan Ingersoll & Rooney PC

(57) ABSTRACT

A method and a system for automated switchover timer's tuning on network systems or Next Generation Emergency Systems configured so that the sending, by a master node, of a heartbeat and/or ARP ping to one or more backup nodes and/or a surveillance unit according to preconfigured switchover timer values can occur to check if the master node is still active. One or more backup nodes and/or a surveillance unit, can use an additional first Session Initiation Protocol (SIP) OPTION message to the master node after receiving the heartbeat and/or the ARP ping or if the heartbeat and/or ARP ping fails to be received according to the switchover timer values. An administrator or an administrative unit of the network can perform a switchover or failover to a backup node in case the first SIP OPTION message is not answered with a suitable response by the master node.

14 Claims, 2 Drawing Sheets

(56) References Cited

OTHER PUBLICATIONS

Wei-Min Wu et al., "A Fast Failure Detection and Failover Scheme for SIP High Availability Networks", Dependable Computing, 2007. PRDC 2007, 13th IEEE International Symposium on Pacific Rim Dependable Computing, Dec. 17, 2007 (pp. 187-190).
The Extended European Search Report for European Application No. 22191989.7 dated Jan. 20, 2023.

* cited by examiner

METHOD AND SYSTEM FOR AUTOMATED SWITCHOVER TIMERS TUNING ON NETWORK SYSTEMS OR NEXT GENERATION EMERGENCY SYSTEMS

CROSS-REFERENCE TO RELATED APPLICATIONS

The present application claims priority to European Patent Application No. EP 22 191 989.7 filed on Aug. 24, 2022. The entirety of this patent application is incorporated by reference herein.

FIELD

The present invention relates to a method and a system for automated switchover timer's tuning on network systems or Next Generation Emergency Systems.

BACKGROUND

Switchover is the manual switch from one system to a redundant or standby computer server, system, or network upon the failure or abnormal termination of the previously active server, system, or network, or to perform system maintenance, such as installing patches, and upgrading software or hardware.

The automatic switchover of a redundant system in the event of an error condition without human intervention is called failover. The manual switchover in case of an error would be used if an automatic failover is not available, possibly because the overall system is too complex.

SUMMARY

We determined that the switchover time is very critical on some network systems like Next Generation Emergency systems (NG911/NG112, wherein 911 is primarily used in North America and 112 is primarily used in Europe). Different from an enterprise environment network system, the switchover time in a redundant system like in a Next Generation Emergency System needs to be much shorter, limited to a very few seconds only.

The Border Control Function (BCF) provides a secure entry into the Emergency Services IP Network (ESInet) for emergency calls presented to the network. The BCF incorporates a firewall, admission control, and may include anchoring of session and media as well as other security mechanisms to prevent deliberate or malicious attacks on Public Safety Answering Points (PSAPs) or other entities connected to the ESInet.

A PSAP can be a communication device that includes hardware, which can include a processor connected to a non-transitory computer readable medium and at least one transceiver. The computer readable medium can be a non-transitory memory, for example. Each PSAP can include at least one input device and at least one output device, such as, for example, a display, a touch screen display, a pointer device, a mouse, a microphone, a speaker, a stylus, a keyboard, and/or a camera. Code can be stored on the memory that can define at least one method that can be performed by the PSAP when the processor runs the code. The code can include code of at least one application, for example.

In some embodiments, other ESInet entities can include at least one Emergency Services Routing Proxy (ESRP). An ESRP can be a communication device that includes hardware, which can include a processor connected to a non-transitory computer readable medium and at least one transceiver. The computer readable medium can be a non-transitory memory, for example. Each ESRP can include at least one input device and at least one output device, such as, for example, a display, a touch screen display, a pointer device, a mouse, a microphone, a speaker, a stylus, a keyboard, and/or a camera. Code can be stored on the memory that can define at least one method that can be performed by the ESRP when the processor runs the code. The code can include code of at least one application, for example. Examples of an ESRP can include one or more servers configured to function as an ESRP, for example.

The ESInet can be a managed IP network that is used for emergency services communications, and which can be shared by all public safety agencies. It provides the IP (Internet Protocol) transport infrastructure upon which independent application platforms and core services can be deployed, including, but not restricted to, those necessary for providing NG911/NG112 services. ESInets may be constructed from a mix of dedicated and shared facilities. ESInets may be interconnected at local, regional, state, federal, national and international levels to form an IP-based inter-network (network of networks). The term ESInet designates the network, not the services that run on the network.

In Next Generation Emergency Systems, the emergency caller should not hear silence or stay in an unsupported conversation for more than 4 up to 6 seconds according to the current NENA (National Emergency Number Association) and EENA (European Emergency Number Association) standards.

For this purpose, the timers in the switchover mechanism from the BCF system were adjusted to the minimum value possible. To test these timer conditions, multiple performance tests were executed, e.g. in the Boca Raton, or the California Governor's Office of Emergency Services (Cal OES) Project Staging Laboratory.

In test scenarios, the timers for the switchover time from the BCF were validated, and a reduction of the switchover timeout from 15 to 4 seconds was achieved without false positives. However, after some time, a problem was identified in the NG911 Staging Lab test trails. The network started to become slow, and the Address Resolution Protocol (ARP) pings started to fail, triggering a switchover mechanism on a backup system, and causing it a split-brain with the master node.

Split-brain is a computer term, based on an analogy with the medical Split-brain syndrome. It indicates data or availability inconsistencies originating from the maintenance of two separate data sets with overlap in scope, either because of servers in a network design, or a failure condition based on servers not communicating and synchronizing their data to each other. This last case is also commonly referred to as a network partition.

The split-brain problem was solved after increasing the ARP timers manually on both the master and the backup system. After that, some improvements in the redundancy mechanism were implemented to provide a faster switchover process. At this point, the problem seemed to be solved although this had the consequence of the switchover time increased to 5 seconds (on the average).

When the BCF was deployed in the first live PSAP operation, an instability problem and a split-brain condition was verified once again. To mitigate the instability, the stand-by BCF was disconnected, the redundancy was disabled and the BCF was set as a stand-alone system.

Instead of increasing the timers once again, the redundancy mechanism was redesigned to improve reliability and agility and the switchover timers were maintained. The solution is currently working, but it can only be reliable if the network capacity remains stable at the point it is today.

Therefore, currently, there is no automatic method to avoid unnecessary switchovers and to adapt the minimum reliable values of the ARP ping on redundancy systems (like the NG911/NG112 systems) based on the network conditions. As observed in the problems described a delay in the network can affect the communication between nodes in such cases, and only manual configuration could be done in both nodes and keep the calls working and avoid wrong switchovers. It was found that when the redundant systems are in this situation, the transfer of a configuration (like the values of ARP ping timers) would not work. In this state the backup node will try to assume the 'active position' in the network, causing a lot of problems such as the call fails Secure Shell Protocol (SSH) disconnections, etc. The final values for the switchover were discovered only after several trials because the network speed was not stable.

The most common solution for this problem in the state of the art that we are aware of is to set the proper switchover timers in order to obtain the fastest switchover timeout but without causing a split-brain condition. This is obtained by tests considering a lot of aspects such as the architecture of the system and the network reliability.

For example, server failover clustering is a high availability platform that is constantly monitoring the network connections and health of the nodes in a cluster. If a node is not reachable over the network, then recovery actions are taken to recover and bring applications and services online on another node in the cluster. These default settings deliver the best behavior for most customers, however, as clusters are stretched from being inches to possibly miles apart, the cluster may become exposed to additional and potentially unreliable networking components between the nodes. Another factor is that the quality of commodity servers is constantly increasing, coupled with augmented resiliency through redundant components (such as dual power supplies, Network Information Center (NIC) teaming, and multi-path 1/O), the number of non-redundant hardware failures may potentially be fairly rare. Because hard failures may be less frequent, some customers may wish to tune the cluster for transient failures where the cluster is more resilient to brief network failures between the nodes. By increasing the default failure thresholds, the sensitivity to brief network issues that last a short period of time can be decreased. The implementation mentioned above uses a concept already known, namely heartbeat/ARP ping. However, this method is widely known and is even used by BCF and other network enterprise systems.

Thereby, a heartbeat is a periodic signal generated by a hardware or software to indicate normal operation or to synchronize other parts of a computer system. Heartbeat mechanism is one of the common techniques in mission critical systems for providing high availability and fault tolerance of network services by detecting the network or systems failures of nodes or daemons which belong to a network cluster—administered by a master server—for the purpose of automatic adaptation and rebalancing of the system by using the remaining redundant nodes on the cluster to take over the load of failed nodes for providing constant services. Usually, a heartbeat is sent between machines at a regular interval in the order of seconds, a heartbeat message. If the endpoint does not receive a heartbeat for a time—usually a few heartbeat intervals—the machine that should have sent the heartbeat is assumed to have failed. Heartbeat messages are typically sent non-stop on a periodic or recurring basis from the originator's start-up until the originator's shutdown. When the destination identifies a lack of heartbeat messages during an anticipated arrival period, the destination may determine that the originator has failed, shutdown, or is generally no longer available.

It would be almost impossible to set an ideal timer as these test methods don't have a guaranteed response, moreover, the mentioned type of configuration can overload a problematic network with ARP ping packets using the "aggressive monitoring" option, for example. Even so, increasing sensibility or decreasing with test parameters without guarantee of delivery, it is not possible to reach the ideal timers for the local network at that moment. This method is not dynamic as the network has problems and does not prevent the system from being out of communication with the other peer. There are already numerous documented problems that prove that this concept is not ideal and that it contemplates issues that leave the system inoperative. Other solutions could be made in terms of trade-offs such as a space-time trade-off, a time-storage trade-off or others. However, it is important to understand that there is no right answer here and that the optimal setting may depend on the specific business needs and service level agreements.

Other solutions deal with what is known as aggressive monitoring. This provides the fastest fault detection and recovery from severe failures, ensuring the highest level of availability. Clustering is less forgiving of short-term failures and in some situations can lead to premature failover of resources in the event of short-term network failures.

Another option is the so-called relaxed monitoring. This provides a more lenient fault detection that offers greater tolerance to short, transient network problems. These longer timeouts mean that cluster recovery from severe failures takes more time and extends downtime.

There are solutions in the state of the art that we are aware of dealing with automatic failover scenarios, thereby handling failovers with network partitions (split-brain scenario). These methods suggest implementing a 30 second delay when a node fails before it performs an automatic failover. This prevents transient network issues or slowness from causing a node to be failed over when it shouldn't be. However, in an emergency system it is unacceptable for a system to wait 30 seconds to make a fallback decision. 30 seconds without calls could be a tragedy. This method is neither dynamic nor has test parameters for an attempt to identify optimal timers.

U.S. Patent Application Publication No. 2012/0124431 A1 describes a method and system for client recovery strategy in a redundant server configuration. It is desirable to use small values for parameters to detect failures and failover to an alternate server as quickly as possible, minimizing downtime and failed requests. However, it should be appreciated that failing over to an alternate server uses resources on that server to register the client and to retrieve the context information for that client. If too many clients failover simultaneously, an excessive number of registration attempts may drive the alternate server into an overload. Therefore, it may be advantageous to avoid failovers for minor transient failures (such as blade failovers or temporarily slow processes due to a burst of traffic). Further, the failure detection time is improved by collecting historical data on response times and the number of retries necessary for a successful response. Thus, TIMEOUT and/or the maximum number of retries can be adaptively adjusted to detect faults and trigger a recovery, as compared to the standard protocol timeout, and retry strategy more rapidly. It should be appreciated that collecting the data and adaptively adjusting the timing parameters may be accomplished using a variety of techniques. However, in at least one form, the data or response times and/or the number of retries are tracked or maintained (e.g. by the client) for a predetermined period, e.g. daily. In such a scenario, the tracked data may be used to make the adaptive or dynamic adjustment. For example, it may be determined (e.g. by the client) that the adjusted value for the timer is set at a certain percentage (e.g. 60%) higher than the longest successful response time tracked for a given period, e.g. for the day and/or the previous day. In a variation, the values may be updated periodically, e.g. every 15 minutes, every 100 packets, etc., to suit the needs of the network. This historical data may also be used to implement adjustments based on predictive behavior. In this described method, all failure handling is for the server, that is, the server-side will adjust the timers according to the response of some tests.

All solutions above are not fit for the dynamic situation and the restricted requirement to have a 4 second maximum silence/unattended call on NG911/NG112 systems during a switchover. Furthermore, all existing methods that we are aware of are not able to re-establish the connection between master (server) and backup.

Therefore, embodiments of the present invention can be based on the object to provide a method and a corresponding system for automated switchover timer's tuning on network systems or Next Generation Emergency Systems. For example, embodiments of our method and system for automated switchover timer's tuning which generate a 4 second maximum silence/unattended call duration on NG911/NG112 systems during a switchover can be provided.

A node in sense of the invention is defined as one of the redundancy server elements. This can be usually the master or slave in a network.

A master server according to the invention is defined as the server which is currently active mode and is responsible for the process of the node pair at a given moment.

A backup server in sense of the invention is defined as a server in a stand-by mode and is used to take over the mastership in case of a master node problem.

According to an embodiment of invention, a method for automated switchover timer's tuning on network systems or Next Generation Emergency Systems is provided that can include: (1) sending, by a master node, a heartbeat and/or ARP ping to one or more backup nodes and/or a surveillance unit according to preconfigured switchover timer values to check if the master node is still active. Then (2) sending, by the one or more backup node and/or the surveillance unit, an additional first Session Initiation Protocol (SIP) OPTION message to the master node after receiving the heartbeat and/or the ARP ping or if the heartbeat and/or ARP ping fails to be received according to the switchover timer values. Then, (3) performing, by an administrator or an administrative unit of the network, a switchover or failover to a backup node in case the first SIP OPTION message is not answered with "200ok" by the master node according to a preconfigured time value.

According to a preferred embodiment, the method further comprises after sending, by the one or more backup node and/or the surveillance unit, the additional first SIP OPTION message to the master node further comprising, recalibrating and decreasing, by the master node, the switchover timer values by sending a second SIP OPTION message comprising a new header indicating the altered switchover timer values, in case the heartbeat and/or the ARP ping have been successfully performed, and the first SIP OPTION has been answered with "200ok" by the master node in the preconfigured time value. Then, storing, by the master node, the switchover timer values which did not cause a heartbeat and/or ARP ping failure in a database. Various steps (e.g. repeating the one or more of the above noted steps) can be performed until the heartbeat and/or ARP ping fails.

Another step of the method can include recalibrating, by the master node, the last stored switchover timer values which did not cause a heartbeat and/or ARP ping failure from the database by using a SIP OPTION message comprising a header indicating the last stored switchover timer values.

The adjustment of the switchover timers using SIP OPTIONS, can guarantee the delivery and makes the timers flexible instead of static ones with long-timers that can cause numerous problems. After the heartbeat/ARP ping from the master node fails to be recognized by the one or more backup node and/or the surveillance unit, the one or more backup nodes and/or a surveillance unit sends the first SIP OPTIONS event to check if the system is online. If this SIP option is returned by the master node, the one or more backup nodes and/or a surveillance unit will know that the master node is still running and will not try to assume itself as the active master.

The master node can initiate an auto-configuration of some network parameters (ARP ping, SIP timers, etc.). These reconfigured timers are then sent by the master node in a second OPTIONS with a new SIP header that contains the news values. Further, the second SIP OPTION can also be used to cause the heartbeat/ARP ping to be performed again. Through this high-level layer (SIP with delivery guarantee), both nodes (master and the one or more backup nodes and/or the surveillance unit) can be reconfigured via Extensible Markup Language (XML) and a connection between nodes can also be re-established if the communication no longer works, e.g. due to a network failure.

According to another preferred embodiment, the method further comprises after sending, by the one or more backup node and/or the surveillance unit, the additional first Session Initiation Protocol, SIP, OPTION message to the master node, recalibrating and increasing, by the master node, the switch over timer values by sending a second SIP OPTION message comprising a new header indicating the altered switchover timer values, in case the heartbeat and/or the ARP ping fails, and the first SIP OPTION has been answered with "200ok" by the master node in the preconfigured time value. Then, repeating different method steps can occur until the heartbeat and/or ARP ping is successful. The method can also include storing, by the master node, the switchover timer values which did not cause a heartbeat and/or ARP ping failure in a database.

According to still another preferred embodiment, wherein the surveillance unit is at least one of another server of the network, a gateway of the network, a Border Control Function (BCF), a Session Border Control (SBC), or any other boundary network equipment as such.

Further, according to a preferred embodiment, wherein the master node and the one or more backup node comprising each a real Internet Protocol (IP), address and/or wherein the master node comprising additionally a Virtual IP (VIP), to determine the mastership in the network.

The redundancy system (the master) is in charge of notifying that it is using the VIP by sending an ARP ping to the surveillance unit which can be a network gateway.

According to yet another preferred embodiment, wherein the switchover timer values comprising a master down timer to consider that the master node is not active or down, a heartbeat timer which is the time to send an heartbeat to another node in the network, a ping timer, which is the interval to send pings to another node in the network, a ping timeout, which is the interval to receive a ping from another node in the network.

Further, according to a preferred embodiment, the method further comprises using, by the network element, a gateway of the network, a BCF, a SBC, or any other boundary network equipment as such, a retry timer to control a test cadence and to collect network reliability.

According to yet another preferred embodiment, wherein the retry timer in a network with dynamic variations is dynamically set to a value of seconds, minutes, or hours and/or wherein the retry timer in a stable network is dynamically set to a value of minutes, hours or days; and wherein the dynamical setting is performed according to the connectivity of the master node in the network.

According to the invention, a system for automated switchover timer's tuning on network systems or Next Generation Emergency Systems is provided, the system is configured to perform the steps of the method.

According to a preferred embodiment, the system further comprises at least a master node, one or more backup nodes, a surveillance unit, a preconfigured set of switchover timer values and a database.

According to another preferred embodiment, the system further comprises an application configured to recalibrate the switchover timers.

According to still another preferred embodiment, the system further comprises an administrator, or an administrator unit configured to perform the switchover or failover to the one or more backup node in case the master node is down or not active.

According to yet another aspect of the present invention, a program element storable on a non-transitory computer readable medium is provided, which when being executed by a processor is adapted to carry out steps of the method for automated switchover timer's tuning on network systems or Next Generation Emergency Systems.

According to another aspect of the present invention, a non-transitory computer-readable medium comprising program code is provided, which when being executed by a processor is adapted to carry out steps of the method for automated switchover timer's tuning on network systems or Next Generation Emergency Systems.

A non-transitory computer-readable medium may be, for example, a floppy disk, a hard disk, an USB (Universal Serial Bus) storage device, a RAM (Random Access Memory), a ROM (Read Only Memory) or an EPROM (Erasable Programmable Read Only Memory). A computer-readable medium may also be a data communication network, e.g. the Internet, which may allow downloading a program code.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of a subject-matter also any combination between features relating to different types of subject-matters is considered to be disclosed with this text. In particular combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing. It should be appreciated that like reference numbers can identify similar components.

DETAILED DESCRIPTION

Figure 1:
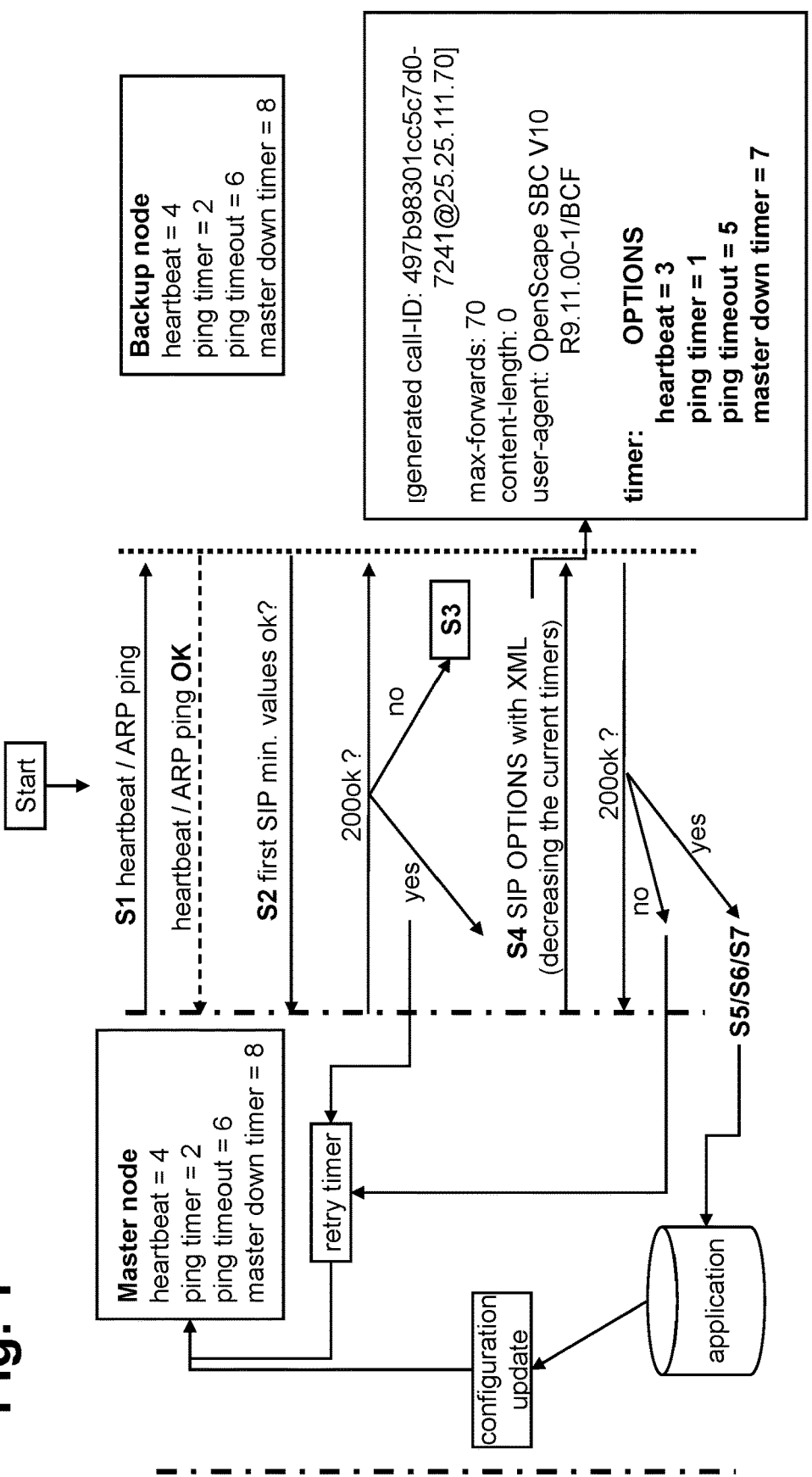
FIG. 1 illustrates a flowchart for determining a minimal timers' configuration according to an exemplary embodiment of the invention.

FIG. 1 schematically shows a flow chart for determining a minimum timer configuration. Embodiments can be configured with the objective to develop an automatic method to determine the fastest switchover time, taking into account the best current values for a switchover mechanism and considering the dynamic aspects as network reliability and speed, system load capacity, and any other external events that could contribute to the switchover timeout.

Currently, in most redundant systems, as soon as a change is made on the master node that requires a restart (host name, Network Time Protocol, etc.), it is rebooted. The backup node remains in backup mode and waits for the master node to reboot and validate the database. The master node then copies the database to the backup node, which then reboots.

Currently, the default and minimum fixed timers for switchover are set to the following values.

Master down timer—It is a timer to consider that the master node is down, meaning it is not working properly due to any kind of failure. The minimum value for this timer is 3 seconds while the maximum value is 15 seconds. A default value of 5 seconds is used.

Heartbeat timer—The time to send a heartbeat to the other host. As described a heartbeat is a periodic signal generated by a hardware or software to indicate normal operation or to synchronize other parts of a computer system. The minimum value for this timer is 1 second while the maximum value is 6 seconds. A default value of 2 seconds is used.

When setting the master down timer and the heartbeat timer, the master down timer must be 2 times larger than the heartbeat timer.

Ping timer—It is the timer interval to send pings to other nodes. Ping is a computer network administration software utility used to test the reachability of a host on an Internet Protocol (IP) network. It is available for virtually all operating systems that have networking capability, including most embedded network administration software. Ping measures the round-trip time for messages sent from the originating host to a destination computer that are echoed back to the source. The minimum value for this timer is 3 seconds while the maximum value is 30 seconds. A default value of 10 seconds is used.

Ping timeout—It is the time to receive a ping from the other host. The minimum value for this timer is 7 seconds while the maximum value is 60 seconds. A default value of 30 seconds is used.

When setting the ping timer and the ping timeout, the ping timeout must be 2 times larger than the ping timer.

These minimum timer values described above have already been tested in a network with limitations, below these values, the architecture does not currently allow the switchover to be done. The maximum values result in 15 seconds for the switchover to be triggered.

As shown in FIG. 1, the master node uses a minimum switchover timer configuration. The heartbeat timer is preset to 4 seconds, the ping timer to 2 seconds, the ping timeout to 6 seconds and the master down timer to 8 seconds. With this preset timer configuration, the system checks whether a heartbeat and/or ARP ping signal from the master node can be received and/or is echoed back to the backup node or a surveillance unit of the network (step S1 in FIG. 1 and in FIG. 2). If the heartbeat and/or the ARP ping is echoed back to the backup node or the surveillance unit with the preconfigured minimum timer values, this is also noted in a database. This data collection, for example, allows to configure a retry timer.

A retry timer is used to control a test cadence and to collect network reliability. This retry timer can be configured according to the customer specifications. In a network with dynamic variations, this timer can be set to a low value, whereas in a stable network it could be set to higher values (once a day, for example). It will be activated via the interface of the master node, and once active it will activate the mechanism until it is deactivated again via the interface.

Figure 2:
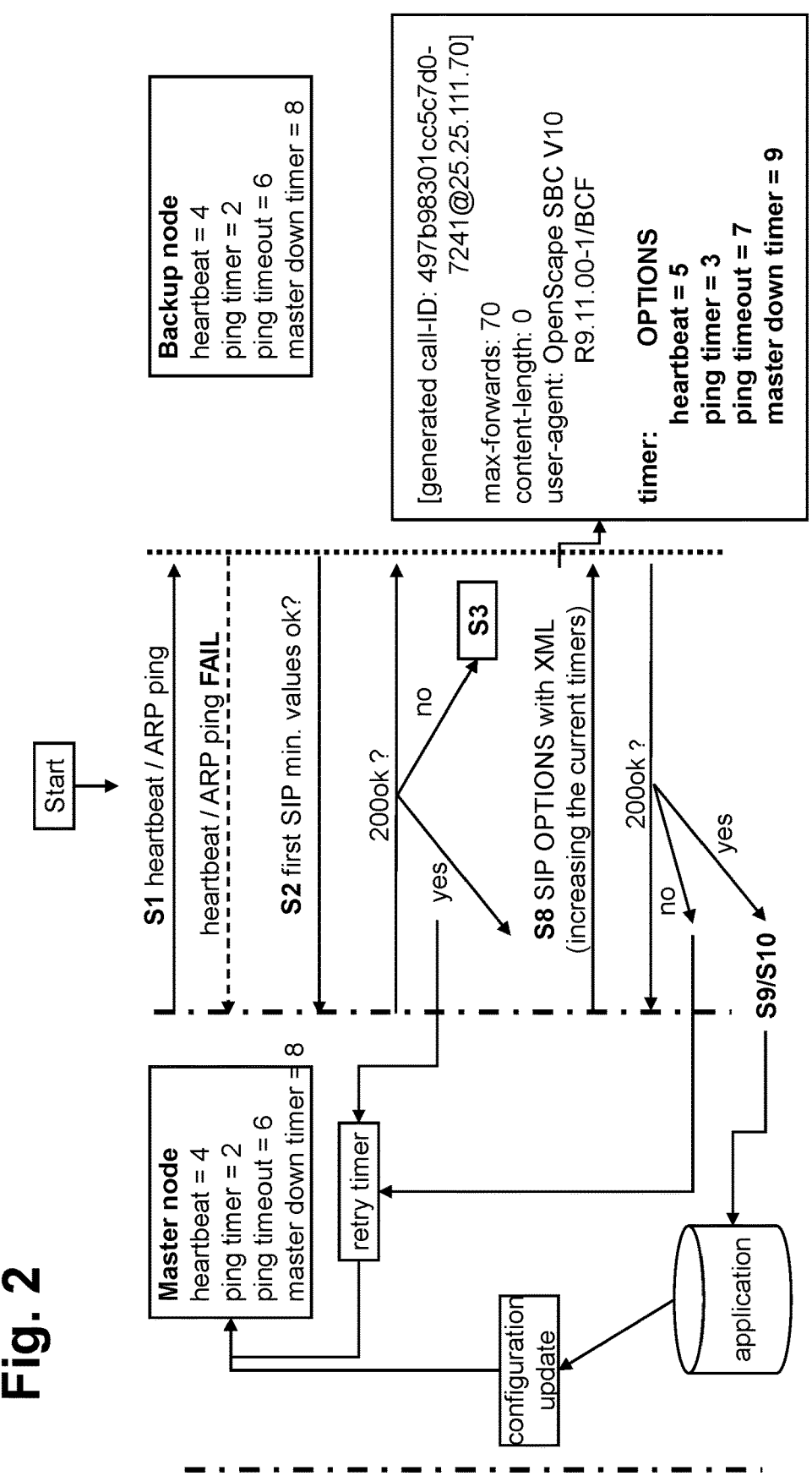
FIG. 2 illustrates another flowchart for communication recovery according to another exemplary embodiment of the invention.

In addition to the heartbeat/APR ping, a first Session Initiation Protocol (SIP) OPTION message is sent from the backup node or a surveillance unit of the network to the master node by using a higher-level layer protocol, namely SIP (see step S2 in FIG. 1 and FIG. 2). In response to this first SIP OPTION message, a second SIP OPTION message is sent by the master node with a new SIP header in Extensible Markup Language (XML) format to the backup node (shown as S4 of FIG. 1). This SIP header contains a new configuration of the switchover timer values. The master node receives a "200ok" response from the backup node. Then a configuration update of the switchover timer on the master node is initiated via a network application (see step S5 in FIG. 1). Then, depending on the setting of the retry timer, the master node sends another heartbeat and/or ARP ping signal to the backup node or the surveillance unit, but this new ping signal is now based on the altered switchover timer values.

The system is configured in such a way that when the heartbeat and/or ARP ping is successfully received or echoed back from the master node, the time intervals of the switchover timers are reduced. These altered timer values are forwarded by the SIP OPTION messages with a new header in XML format to the backup node and the master node by the network application via SIP signaling protocol or any other protocol. The network application can run inside the master and is responsible to receive the new timer values and update the node with the new configuration using these data. Subsequently, a heartbeat and/or ARP ping is used to check whether these new altered timer values are still functional. This flow will be repeated until the system finds the minimal timer configuration, meaning the minimum time values for the timers at which the system still functions.

With this constant testing mechanism, the best-configured success values can be obtained, and they can be stored in a database. When these values are stabilized for a configurable time, the retry time could be reduced or even disabled until there is some other network event that triggers the mechanism again (e.g. IPs conflicts, ARP ping failure, etc.). Since network speed variations are constant, this makes the network performance dynamic, so it would be ideal for this tuning loop to run in reduced times. The retry timer will be set with a minimum value (for example, 1 second), and a maximum value (1 time a day, for example). This may vary according to customer requirements. It is extremely important that this retry timer changes dynamically according to the connectivity tests, because if this time becomes fixed, or the times of previous test results stored in a database are used to obtain an average, for example, the opportunity to obtain the best values if the network has improved performance at any given time will be lost.

This flow is independent of the switchover action, what is done in this logic is to find the best times through this innovative way with the use of SIP (OPTIONS), so that when a traditional way fails, it is also possible to recover the system's communication in cases that the timers are too low. Then it would be possible to re-establish the communication between the nodes by resetting both with bigger timers which is shown in FIG. 2.

Shown is FIG. 2 is a scenario to recover the communication between the master node and the one or more backup node or a surveillance unit of the network (not shown). The steps in this scenario are the same as those in FIG. 1, except that if the heartbeat and/or ARP ping echo is not received in the given time values by the backup node or the surveillance unit (indicated by "FAIL" in FIG. 2) then the backup node or master node sends also a first SIP OPTION message to the master node to determine if it is still active before a switchover is performed (see step S2 in FIG. 2).

If the master node is still active, it sends a second SIP OPTION with a new header in XML format to the backup node and the master node with increased switchover timer values (step S8 in FIG. 2). This re-configuration is repeated until the heartbeat and/or ARP ping is again functional (steps S9/S10 in FIG. 2).

With this type of system setup, the system can be automatically and dynamically adapted to the network conditions without a premature accidental switchover being made even though the master node is still active but does not appear to be accessible in the defined time interval due to the network conditions.

Currently, a system of the state of the art uses the traditional way (ARP ping), if it fails (for the number of times configured), then the switchover is triggered on the backup side, and the communication and adjustment recovery logic with the master starts again until it is reset with the best values again.

Redundant systems usually work with one Virtual IP (VIP), and two real IPs (master and backup). The VIP is used to determine the mastership in the network. The redundancy system (the master) is in charge of notifying that it is using the VIP by sending an ARP ping to the network gateway or the surveillance unit.

There are situations where the VIP ownership could cause conflicts, for example, when there is an outage in the network and both sides (master and backup) try to assume with the VIP, or when the switchover process is too fast, and the backup tries to assume the mastership.

There is a way to prevent this by receiving the following alarm from the network: [Tue July 20 10:28:10 2021] ICMPv6: NA: someone advertises our address 2605:97c0: 2061:7321:0001:0000:0000:0001 on eth1 is already in use!

It is also part of this exemplary embodiment of the method to use this as a trigger point to stop the process of switchover timer decreasing and reverse it to increasing the values until the network system finds stability again. It could also be used to inform the system to increase the timers until establishing the redundancy again.

The automatic adjustment using the two protocols with different layers such as SIP and ARP ping and the internal recognition of network problems (like the duplicity of the Virtual IP detected by the gateway) is a differential from what is deployed currently on the enterprise network systems.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for automated switchover timer's tuning on network systems or Next Generation Emergency Systems comprising:
   (1) sending, by a master node, a heartbeat and/or Address Resolution Protocol (ARP) ping to one or more backup nodes and/or a surveillance unit according to preconfigured switchover timer values to check if the master node is still active;
   (2) sending, by the one or more backup node and/or the surveillance unit, an additional first Session Initiation Protocol (SIP) OPTION message to the master node after receiving the heartbeat and/or the ARP ping or if the heartbeat and/or the ARP ping fails to be received according to the switchover timer values;
   (3) performing, by an administrator or an administrative unit of the network, a switchover or failover to a backup node in case the first SIP OPTION message is not answered with "200ok" by the master node according to a preconfigured time value;
   wherein after the sending, by the one or more backup node and/or the surveillance unit, the additional first SIP OPTION message to the master node:
   (4) recalibrating and decreasing, by the master node, the switchover timer values by sending a second SIP OPTION message comprising a new header indicating the altered switchover timer values, in case the heartbeat and/or the ARP ping have been successfully performed, and the first SIP OPTION message has been answered with "200ok" by the master node in the preconfigured time value;
   (5) storing, by the master node, the switchover timer values which did not cause a heartbeat and/or ARP ping failure in a database;
   (6) repeating steps 1, 2, 4 and 5 until the heartbeat and/or the ARP ping fails; and
   (7) recalibrating, by the master node, the last stored switchover timer values which did not cause a heartbeat and/or ARP ping failure from the database by using a SIP OPTION message comprising a header indicating the last stored switchover timer values.

2. The method of claim 1, wherein after the sending, by the one or more backup node and/or the surveillance unit, the additional first SIP OPTION message to the master node, the method further comprising:
   (8) recalibrating and increasing, by the master node, the switchover timer values by sending a second SIP OPTION message comprising a new header indicating the altered switchover timer values, in case the heartbeat and/or the ARP ping fails, and the first SIP OPTION message has been answered with "200ok" by the master node in the preconfigured time value;
   (9) repeating the method of steps 1, 2 and 8 until the heartbeat and/or ARP ping is successful; and
   (10) storing, by the master node, the switchover timer values which did not cause a heartbeat and/or ARP ping failure in a database.

3. The method of claim 2, wherein the surveillance unit is at least one of another server of the network, a gateway of the network, a Border Control Function (BCF), a Session Border Control (SBC), or is boundary network equipment.

4. The method of claim 3, wherein the master node and the one or more backup nodes has a real Internet Protocol (IP) address and/or wherein the master node has a Virtual IP, (VIP) to determine mastership in the network.

5. The method of claim 3, wherein the switchover timer values comprising a master down timer to consider that the master node is not active or down, a heartbeat timer which is the time to send an heartbeat to another node in the network, a ping timer, which is the interval to send pings to another node in the network, a ping timeout, which is the interval to receive a ping from another node in the network.

6. The method of claim 3, comprising, using, by the SBC or the boundary network equipment, a retry timer to control a test cadence and to collect network reliability.

7. The method of claim 6, wherein the retry timer in a network with dynamic variations is dynamically set to a value of seconds, minutes, or hours and/or wherein the retry timer in a stable network is dynamically set to a value of minutes, hours or days; and wherein the dynamical setting is performed according to the connectivity of the master node in the network.

8. A system for automated switchover timer's tuning on network systems or Next Generation Emergency Systems, wherein the system is configured to perform the method of claim 1.

9. The system according to claim 8, wherein the system comprises at least a master node, one or more backup nodes, a surveillance unit, a preconfigured set of switchover timer values and a database.

10. The system of claim 9, wherein the system is configured to recalibrate the switchover timers.

11. The system of claim 10, wherein the system further comprising an administrator, or an administrator unit configured to perform the switchover or failover to the one or more backup node in case the master node is down or not active.

12. A communication apparatus comprising:
a master node communicatively connectable to one or more backup nodes and/or a surveillance unit;
the master node configured to send a heartbeat and/or Address Resolution Protocol (ARP) ping to the one or more backup nodes and/or a surveillance unit according to preconfigured switchover timer values to verify that the master node is still active;
the one or more backup node and/or the surveillance unit configured to send an additional first Session Initiation Protocol (SIP) OPTION message to the master node after receiving the heartbeat and/or the ARP ping or if the heartbeat and/or the ARP ping fails to be received according to the switchover timer values;
the communication apparatus configured to perform a switchover or failover to a backup node in case the first SIP OPTION message is not answered with "200ok" by the master node according to a preconfigured time value;
wherein the master node is configured to recalibrate and decrease the switchover timer values by sending a second SIP OPTION message comprising a new header indicating the altered switchover timer values, in case the heartbeat and/or the ARP ping have been successfully performed, and the first SIP OPTION has been answered with "200ok" by the master node in the preconfigured time value;
the master node also configured to store the switchover timer values which did not cause a heartbeat and/or ARP ping failure in a database; and
the master node configured to recalibrate the last stored switchover timer values which did not cause a heartbeat and/or ARP ping failure from the database by using a SIP OPTION message comprising a header indicating the last stored switchover timer values.

13. A communication apparatus comprising:
a master node communicatively connectable to one or more backup nodes and/or a surveillance unit;
the master node configured to send a heartbeat and/or Address Resolution Protocol (ARP) ping to the one or more backup nodes and/or a surveillance unit according to preconfigured switchover timer values to verify that the master node is still active;
the one or more backup node and/or the surveillance unit configured to send an additional first Session Initiation Protocol (SIP) OPTION message to the master node after receiving the heartbeat and/or the ARP ping or if the heartbeat and/or the ARP ping fails to be received according to the switchover timer values;
the communication apparatus configured to perform a switchover or failover to a backup node in case the first SIP OPTION message is not answered with "200ok" by the master node according to a preconfigured time value; and
wherein the master node is also configured to recalibrate and increase the switchover timer values by sending a second SIP OPTION message comprising a new header indicating the altered switchover timer values, in case the heartbeat and/or the ARP ping fails, and the first SIP OPTION message has been answered with "200ok" by the master node in the preconfigured time value.

14. The communication apparatus of claim 13, wherein the master node is also configured to store the switchover timer values which did not cause a heartbeat and/or ARP ping failure in a database.

\* \* \* \* \*